June 25, 1929. J. MACNAB ET AL 1,718,655
LIGHT REFLECTOR
Filed Nov. 22, 1926
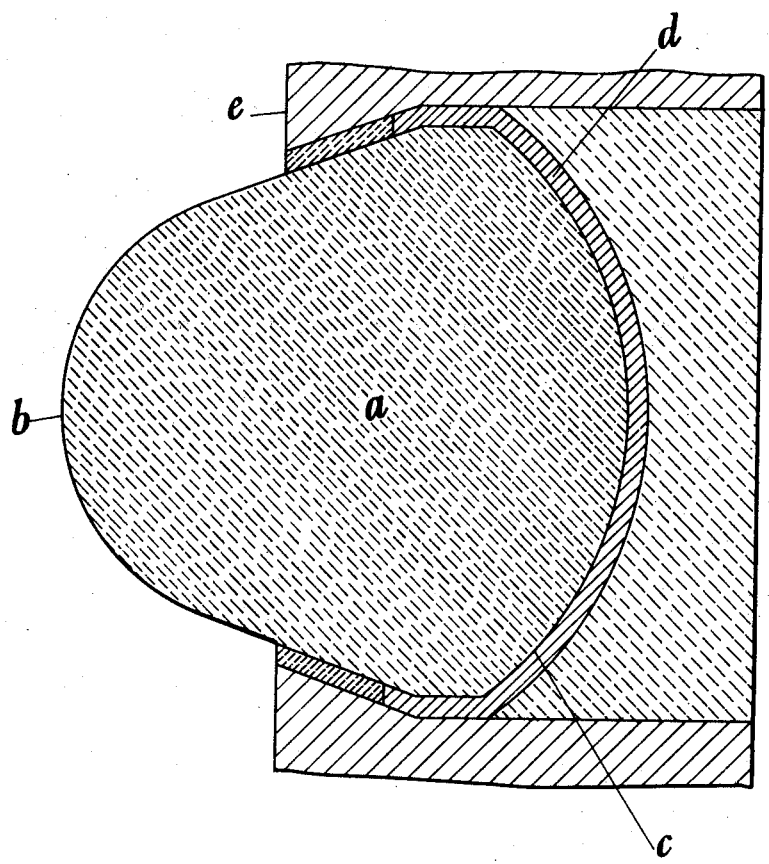
J. MacNab and
E. Osbaldiston
inventors
By: Marks & Clark
Attys.

Patented June 25, 1929.

1,718,655

UNITED STATES PATENT OFFICE.

JOSEPH MACNAB AND ERNEST OSBALDISTON, OF MARPLE, ENGLAND.

LIGHT REFLECTOR.

Application filed November 22, 1926, Serial No. 150,099, and in Great Britain July 17, 1926.

This invention relates to light reflectors of the kind in which a front refracting surface is combined with a rear reflecting surface. The object of the invention is to provide an improved reflector of this kind, suited particularly for use in road signs, advertising devices, rear reflectors for cycles and road vehicles, and other analogous purposes.

The invention comprises a solid glass element having a convex front refracting surface and concave rear reflecting surface, both having a common centre of curvature and the rear surface being situated at or near the focus of the front surface.

Also the invention comprises a solid glass element of frustro conical form in which the reflecting surface is of larger diameter than the front aperture of the device.

The accompanying drawing illustrates a reflecting device constructed in accordance with this invention.

A solid glass element $a$ is formed with a convex and approximately hemispherical front refracting surface $b$. The rear surface $c$ is also convex and has the same centre of curvature as the front surface. The rear surface is situated at or near the focus of the front surface, and is silvered or otherwise treated to form a concave reflecting surface, or has arranged in direct contact with it a concave metallic or other reflector $d$. The device is mounted in any suitable holder $e$.

The glass element is made of frustro conical form in order that the reflecting surface may be of larger diameter than the front surface or aperture.

If desired the glass may be tinted, or the front or rear surfaces may be provided with a transparent coloured cover piece.

In road signs, advertising devices and the like a plurality of small elements as above described are combined in the usual manner. For these and other purposes the dimensions and constructional details may however, be varied as required.

We claim:—

1. A light reflector of frustro conical form having a convex front refracting surface, a convex rear reflecting surface subtending a greater angle than the said front surface, and a conical portion extending between the said front and rear surfaces, the said surfaces having a common centre of curvature and the rear surface situated approximately at the focus of the front surface.

2. A light reflector comprising a glass element of frustro conical form having a convex front surface, a convex rear surface subtending a greater angle than the said front surface, and a conical part extending between said front and rear surfaces, in combination with a reflector in contact with said rear surface and with a portion of the surface of said conical part.

In testimony whereof we have signed our names to this specification.

JOSEPH MACNAB.
ERNEST OSBALDISTON.